United States Patent [19]
Walker et al.

[11] 4,422,409
[45] Dec. 27, 1983

[54] AUTOMATIC ANIMAL FEEDING APPARATUS

[75] Inventors: Ralph Walker, 6340 Glenhills Way, Sacramento, Calif. 95824; David Bories, Fair Oaks, Calif.

[73] Assignee: Ralph T. Walker, Sacramento, Calif.

[21] Appl. No.: 330,444

[22] Filed: Dec. 14, 1981

[51] Int. Cl.³ ............................................. A01K 5/02
[52] U.S. Cl. ............................... 119/51.11; 119/51.5; 119/56 R
[58] Field of Search ............... 119/51.11, 51.12, 51.13, 119/56 R, 51.5; 222/367, 370

[56] References Cited
U.S. PATENT DOCUMENTS

| 1,174,285 | 3/1916 | Ritter | 222/370 X |
| 3,340,851 | 9/1967 | Frank et al. | 119/51.5 X |
| 3,741,162 | 6/1973 | Lopez | 119/51.13 |
| 3,762,373 | 10/1973 | Grossman | 119/51.11 |
| 4,000,719 | 1/1977 | Richards | 119/51.13 |
| 4,256,054 | 3/1981 | Hitchcock | 119/51.11 |

*Primary Examiner*—Robert P. Swiatek
*Attorney, Agent, or Firm*—Mark C. Jacobs

[57] ABSTRACT

Apparatus for automatically supplying food and water to an animal wherein food is introduced into a food ring mounted on a rotatable carousel, the rotation thereof being controlled by a timer. Water is introduced at timed intervals through spray nozzles for both cleaning the food ring, after the animal has eaten, and moisturizing the food prior to being eaten.

10 Claims, 4 Drawing Figures

AUTOMATIC ANIMAL FEEDING APPARATUS

BACKGROUND OF THE INVENTION

1. Field of the Invention

The invention relates to animal feeding apparatus; and, more particularly, to apparatus for storing food and releasing controlled amounts of food and water from a remote source at predetermined intervals to an animal.

2. Description of the Prior Art

Devices for feeding animals are well known in the art. Some of these devices, such as that disclosed in U.S. Pat. No. 3,134,360, require a certain action on the part of the animal to release food. If such devices are not activated properly, the animal may not be fed. Timed devices, such as that described in U.S. Pat. No. 3,762,373, have been suggested but are quite complicated and expensive. Devices such as that described in U.S. Pat. No. 3,754,527, that are operated by gravity, may not always work successfully. Also, none of these prior art devices have means for cleaning the food dish or introducing water for cleansing and spraying.

Since more and more people are entering the work force, pets are left for longer periods of time. This invention thus has wide scale applications in kennels, zoos and private homes. This invention has particular application where a few employees must tend a large number of animals. This invention has applications whether or not the animal is or is not totally confined.

SUMMARY OF THE INVENTION

It is an object of this invention to provide apparatus for automatically providing food and water at timed intervals to an animal.

It is an object of this invention to carry out the foregoing object where the apparatus is self-cleaning.

It is still another object of the invention to provide such apparatus which premoistens the food.

These and other objects are preferably accomplished by providing an enclosure where food is introduced into a food ring mounted on a rotatable carousel, the rotation being controlled by a timer. Water is introduced at timed intervals through spray nozzles for both cleaning the food ring, after the animal has eaten, and moisturizing the food prior to being eaten.

DESCRIPTION OF THE PREFERRED EMBODIMENT

Figure 1:
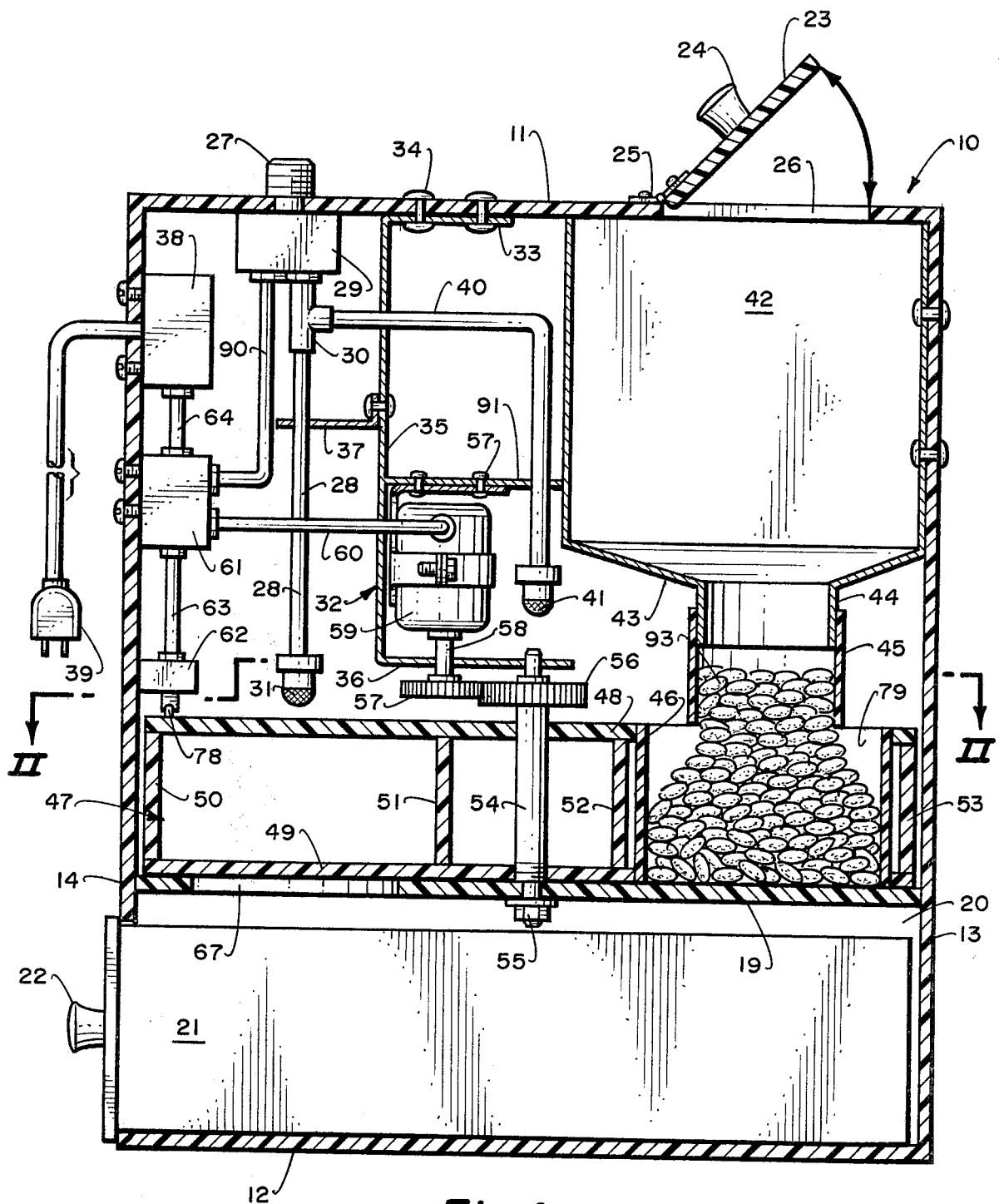
FIG. 1 is a vertical sectional view of apparatus in accordance with the teachings of the invention.
Figure 2:
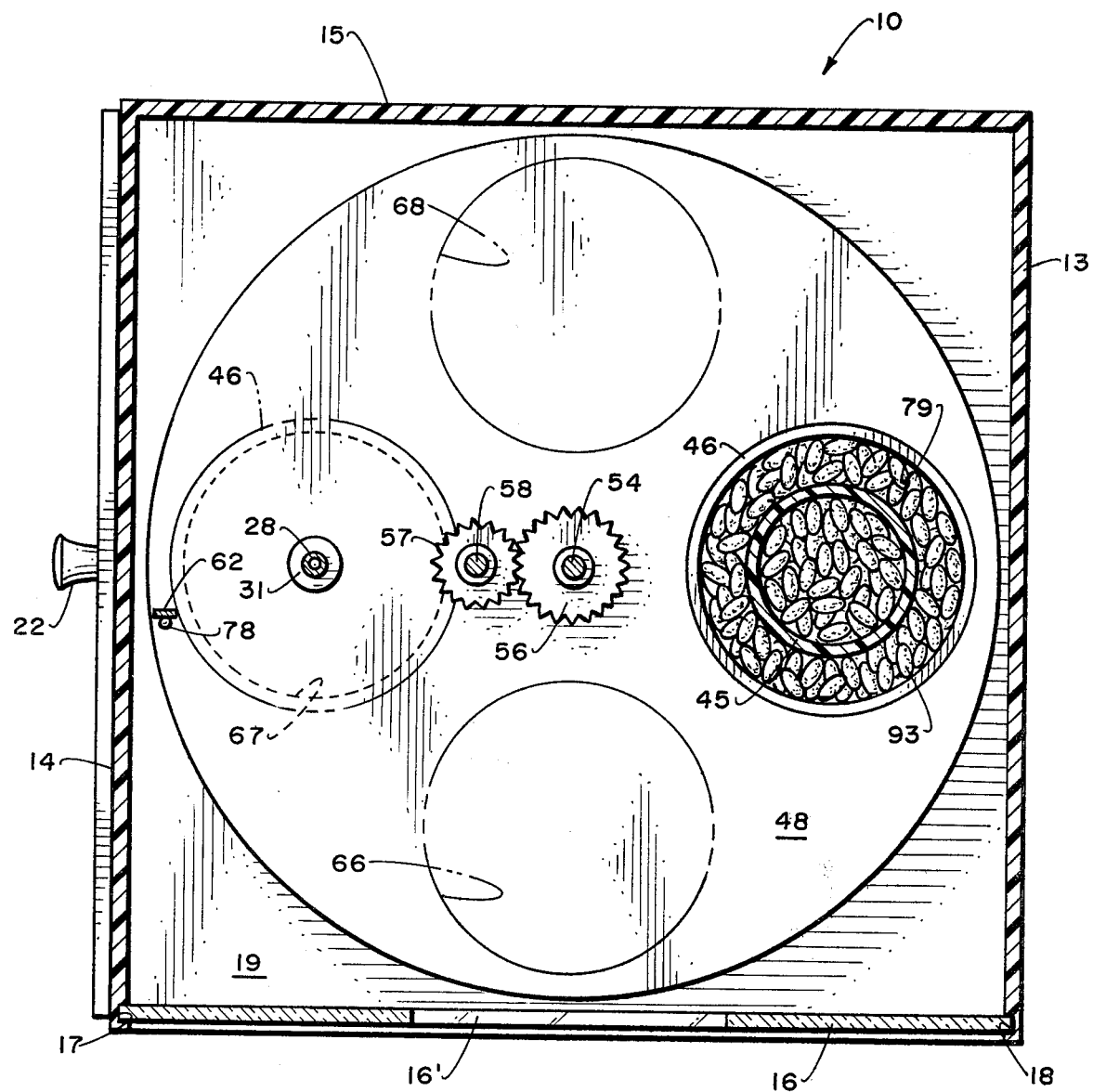
FIG. 2 is a view taken along lines II—II of FIG. 1.

Referring now to FIG. 1 of the drawing, apparatus 10 is in the form of a box having a top wall 11, a bottom wall 12, side walls 13,14, rear wall 15 and front wall 16 (see FIG. 2). As can be seen in FIG. 2, side walls 13,14 may be provided with elongated notches 17,18 for slidably receiving front wall 16 therein. Wall 16 may be of glass, plastic, opaque or transparent, and removable for easy access to the interior of the apparatus 10 for cleaning the same.

Referring again to FIG. 1, a partition wall 19 is spaced from bottom wall 12 forming a waste compartment 20. For ease of cleaning, a removable drawer 21, having a knob 22, may be slidably mounted in compartment 20 and easily removed for cleaning the same.

As shown in FIG. 1, a door 23, having knob 24, is hingedly mounted to top wall 11, one or more hinges 25 closing off opening 26. In this manner, access to the food bin, as will be discussed, in apparatus 10 is provided. Hinges may be spring-biased or otherwise strong enough to bias door 23 into a normally closed position.

Water can be introduced into apparatus 10 from a suitable remote source, such as a sink or the like. Thus, a hose (not shown) may lead from such sink and include a conventional threaded end for threadably interconnecting to a threaded fitting 27 fixedly mounted in top wall 11 (see particularly FIG. 1). A hollow tubing 28, such as solid plastic, copper or aluminum, is fluidly connected to fitting 27, passes through a conventional solenoid 29, to a Tee-shaped connection 30, down to the spray nozzle 31.

A U-shaped bracket 32 has a flat horizontal end 33 secured to the underside of top wall 11 by rivets 34 or the like and a downwardly extending vertical portion 35 terminating in a second flat horizontal portion 36. Tubing 28 extends through an aperture in bracket 37 secured to vertical portion 35. Nozzle 31 is preferably round with a plurality of spray openings. Solenoid 29 is electrically connected, via conduit 90, to an electrically operated trip circuit 61, as will be discussed, mounted to side wall 14.

An electric plug 39 is provided leading from timer 38 for actuating the same. A second tubing 40, preferably solid tubing, as plastic, aluminum, copper, etc., with a throughbore, extends from tee fitting 30, through a suitable aperture in bracket 32, and terminates in a second spray nozzle 41. See FIG. 4.

Food is introduced into apparatus 10 through opening 26 into a bin or feed container 42, (see also FIG. 2) which may be of metal or the like terminating in a downwardly extending sloped portion or funnel 43 having its lowermost tubular end fitting into a resilient collar 45, such as rubber, in communication with an opening 79 through top wall 48 leading into a feed ring 46.

As is seen in FIGS. 1 and 2, a carousel 47 is provided in apparatus 10 on top of partition wall 19 with feed ring 46 disposed therein. This carousel 47 is rotatably mounted, as will be discussed, and includes a round top wall 48, a spaced round bottom wall 49 and interconnecting partition walls 50,51, 52 and 53. A bearing 54 extends through walls 48,49 and 19 (secured by lock nut and washer 55) and terminates at its upper end in toothed gear 56 meshing with a drive gear 57 fixed to motor shaft 58 of a conventional D.C. motor 59. Shaft 58 extends through portion 36 of bracket 32.

Motor 59 is mounted to bracket 32 via rivets 57 connecting the same to a plate extending from bracket 32. An electrical conduit 60 extends from motor 59 to an electric trip circuit 61 mounted on side wall 14. This circuit 61 is controlled by a microswitch 62 mounted on wall 14 and interconnected to circuit 61 by conduit 63. An electric conduit 64 interconnects timer 38 to circuit 61 with conduit interconnecting circuit 61 to motor 59.

In operation, door 23 is opened and food is placed in bin 42 where it passes through funnel 43 to feed ring 46.

Water is periodically introduced through fitting 27, via timer 38 and solenoid 29, to spray water out of both nozzles 31,41.

Motor 59 is activated to rotate carousel 47 to move the feed ring 46 to the animal feed position 66 on wall 19 shown in dotted lines in FIG. 2. Continued rotation of carousel 47, via motor 59 controlled by switch 62, circuit 61 and timer 38, moves the feed ring 46, which is open by the bottom, over an opening 67 in the wall 19, thus dumping any waste food into drawer 21. In this manner, it can be seen that there is provided a means for easily providing food and water to a confined animal at controlled intervals. The circuit 61 can be preset to any desired time frame and the entire apparatus 10 may be self-contained or connected to a larger apparatus, such as an animal run, where the animal may frolic and return to apparatus 10 for feeding. Nozzle 31 is adapted to spray the ring 46 after feeding to rinse the same. The ring 46, after rinsing and before the next feeding cycle, dries while stationary (at resting place 68, indicated in dotted lines in FIG. 2).

Water is provided to the animal through nozzle 41. After the timer 38 actuates motor 59, the carousel 47 is rotated until microswitch 62 engages a protrusion 78 on the top of top wall 48 of carousel 47. This engagement activates thd microswitch 62 and cuts off power to motor 59 but supplies enough power to solenoid 29 to spray water for a predetermined period of time set by the circuit 61. As the carousel 47 rotates, top wall 48 thereof seals off the bottom open end of collar 45 since the opening 79 moves out of the path of collar 45. Since tubing or collar 45 may be resilient, this movement squeezes off the opening shutting off food flow until the ring 46 is again in place. Nozzle 31 directs water into the feed ring 46 to rinse the same whereas nozzle 41 opens above the food in ring 46 to moisten the same.

Figure 3:
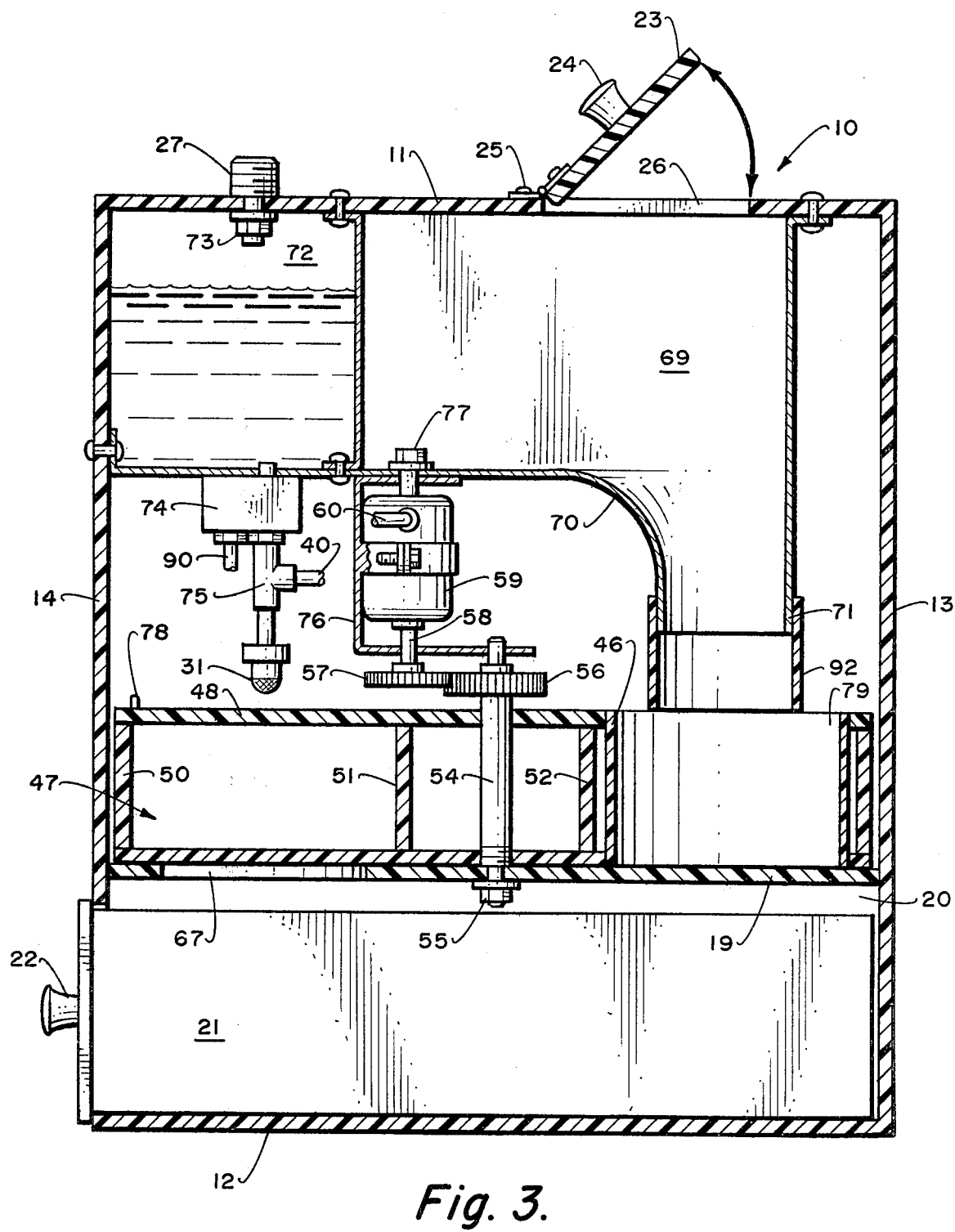
FIG. 3 is a vertical sectional view of a modification of the invention.

FIG. 3 shows an alternate embodiment wherein like numerals refer to like parts of the embodiment of FIGS. 1 and 2. In this embodiment, the feed bin 69 has a bottom wall curving downwardly at 70 to provide a cylindrical end 71 securely fitting in annular open tube 92, which may be resilient, opening into feed ring 46. Instead of controlled water flow through tubing 28, a water container 72 is provided communicating with fitting 27, secured to top wall 11 by a nut and washer 73. A solenoid assembly 74 fluidly interconnects container 72 with tubing 75 leading to both nozzle 31 and nozzle 41 (nozzle 41 has been ommitted for convenience of illustration as have the automatic timing controls for motor 59 and solenoid assembly 75). As can be seen, in this embodiment, motor 59 is mounted to a U-shaped bracket 76 connected to the bottom curved wall 70 of bin 69 by a suitable nut 77. The operation of the embodiment of FIG. 3 is otherwise identical to that of FIGS. 1 and 2 except that the water is normally stored in container 72 and released therefrom by actuation of solenoid assembly 74.

The materials forming the enclosure of apparatus 10 of the invention may be any suitable type, such as plastics, metal, stiff cardboard, fiberglass, etc. The various tubings may be plastic, copper, steel, aluminum, etc. Although an external A.C. source of electricity has been disclosed, the system can be run off of a D.C. battery, or a combination of both, to provide a backup system, as is well known to the artisan.

If desired, the temperature of the water entering the apparatus of FIGS. 1 to 3 and the overall temperature of the apparatus may be controlled in any suitable manner.

The walls may be insulated. The drawer 21 may be removed at any desired time for cleaning. Although one ring 46 has been discussed, more than one may be provided, e.g., at station 68 thereby drying one ring while the other picks up food.

It can be seen that there is disclosed a novel manner of providing food and water to a confined animal. The apparatus is easy to clean and requires little attention thereby allowing the animal to be left unattended for an appreciable length of time. The timing controls may be sophisticated enough to permit relatively long periods of control.

Figure 4:
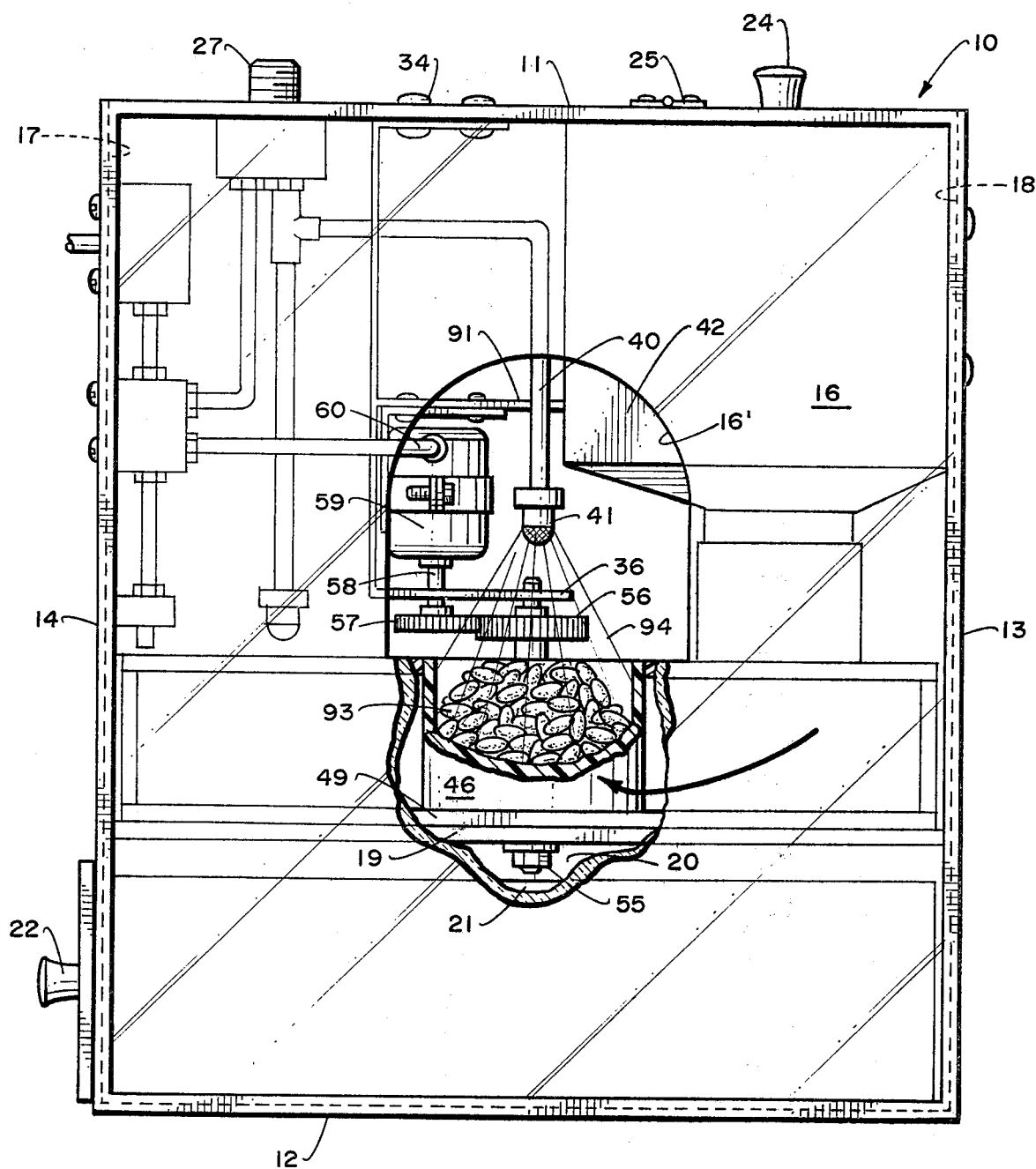
FIG. 4 is a front elevational view of the device of this invention.

In addition as is seen in FIG. 4, the front wall 16 includes an opening 16', sized only to permit an animal such as a dog or cat to place his nose into the apparatus 10 to access the food, without causing damage to any of the internal parts of the device. In this figure door 23 is in its closed position.

Changes may be made herein without departing from the scope and spirit of the invention.

I claim:

1. Apparatus for providing food and water to an animal comprising:
    a housing;
    a partition wall dividing the interior of the housing into an upper water and food chamber and a lower enclosed accessible waste chamber;
    a rotatable carousel having spaced top and bottom walls disposed above said partition separating the upper and lower chambers;
    a water inlet opening into the interior of the upper chamber;
    a food storage bin mounted in said upper chamber, said bin communicating at its lower end with an opening in said top wall of said carousel, said opening in said top wall of said carousel communicating with a food ring, adapted to receive food from said bin, disposed between the top and bottom walls of said carousel; and
    an opening in said partition wall remote from said lower end of said bin communicating with the interior of said waste chamber whereby waste remaining in said food ring can move by gravity from said food ring to said waste chamber upon rotation of said carousel, said carousel having an animal feed position intermediate of said lower end of said bin and said opening in said partition wall wherein food is exposed to said animal.

2. In the apparatus of claim 1 wherein said water inlet is a spray nozzle opening above said carousel and substantially vertically above said opening in said partition wall.

3. In the apparatus of claim 1 wherein said water inlet is an opening leading into a water container in said water and food chamber, and an outlet in said container fluidly interconnecting the interior of said container with a spray nozzle opening above said carousel and generally vertically above the opening in said partition wall.

4. In the apparatus of claim 1 wherein a removable waste food receiving drawer is mounted in said water chamber.

5. In the apparatus of claim 1 wherein the lower end of said bin includes a tapered opening extending into a resilient tube having its terminal end communicating with the opening in said carousel.

6. In the apparatus of claim 1 including a hinged door normally closing off an opening in said housing leading into the interior of said bin for introducing food therein.

7. In the apparatus of claim 1 including a motor coupled to said carousel for rotating the same, and timing circuit means interconnecting both said motor and said water inlet for both rotating said carousel at predetermined intervals and introducing water into said water and food chamber at predetermined intervals.

8. In the apparatus of claim 7 wherein said timing circuit means includes switch means adapted to be engaged by a protrusion on said carousel when said carousel is rotated.

9. Apparatus for providing food and water to an animal comprising:
   a housing;
   a partition wall dividing the interior of the housing into an upper water and food chamber and a lower enclosed accessible waste chamber;
   a rotatable carousel having spaced top and bottom walls disposed above said partition separating the upper and lower chambers;
   a water inlet opening into the interior of the upper chamber;
   a food storage bin mounted in said upper chamber, said bin communicating at its lower end with an opening in said top wall of said carousel, said opening in said top wall of said carousel communicating with a food ring, adapted to receive food from said bin for exposure to said animal, disposed between the top and bottom walls of said carousel;
   an opening in said partition wall remote from said lower end of said bin communicating with the interior of said waste chamber;
   wherein said water inlet comprises a first spray nozzle opening above said carousel and substantially vertically above said opening in said partition wall, and
   a second spray nozzle opening vertically above said carousel between vertical planes extending through both said opening in said carousel, when aligned with said lower end of said bin, and said opening in said partition wall.

10. Apparatus for providing food and water to an animal comprising:
   a housing;
   a partition wall dividing the interior of the housing into an upper water and food chamber and a lower enclosed accessible waste chamber;
   a rotatable carousel having spaced top and bottom walls disposed above said partition separating the upper and lower chambers;
   a water inlet opening into the interior of the upper chamber;
   a food storage bin mounted in said upper chamber, said bin communicating at its lower end with an opening in said top wall of said carousel, said opening in said top wall of said carousel communicating with a food ring, adapted to receive food from said bin for exposure to said animal, disposed between the top and bottom walls of said carousel;
   an opening in said partition wall remote from said lower end of said bin communicating with the interior of said waste chamber, wherein said water inlet is an opening leading into a water container in said water and food chamber, and an outlet in said container fluidly interconnecting the interior of said container with a first spray nozzle opening above said carousel and generally vertically above the opening in said partition wall, and further including a second spray nozzle fluidly connected to said outlet above said carousel at a point spaced between vertical planes extending through both the opening in said partition wall and the opening in said carousel, when aligned with said lower end of said bin.

* * * * *